(12) United States Patent
Zhang et al.

(10) Patent No.: US 12,365,636 B2
(45) Date of Patent: *Jul. 22, 2025

(54) MICROBIAL PROTECTANT IN HIGH-NUTRIENT AND HIGH-ACTIVITY CHEMICAL FERTILIZER-BIOLOGICAL COMPOUND FERTILIZER AND PREPARATION METHOD THEREOF

(71) Applicants: SHANDONG ACADEMY OF AGRICULTURAL SCIENCES, Shandong (CN); WUZHOU FENG AGRICULTURAL TECHNOLOGY CO., LTD, Shandong (CN)

(72) Inventors: Yufeng Zhang, Shandong (CN); Zhaohui Liu, Shandong (CN); Yan Chi, Shandong (CN); Zhikai Zhang, Shandong (CN)

(73) Assignees: SHANDONG ACADEMY OF AGRICULTURAL SCIENCES, Jinan (CN); WUZHOU FENG AGRICULTURAL TECHNOLOGY CO., LTD, Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/935,699

(22) Filed: Nov. 4, 2024

(65) Prior Publication Data
US 2025/0059104 A1 Feb. 20, 2025

Related U.S. Application Data

(63) Continuation of application No. PCT/CN2024/077724, filed on Feb. 20, 2024.

(30) Foreign Application Priority Data

Feb. 20, 2023 (CN) .......................... 202310138446.X

(51) Int. Cl.
| | | |
|---|---|---|
| C05B 7/00 | (2006.01) |
| A01N 27/00 | (2006.01) |
| A01N 31/00 | (2006.01) |
| C05C 3/00 | (2006.01) |
| C05C 9/00 | (2006.01) |
| C05D 1/00 | (2006.01) |
| C05D 1/02 | (2006.01) |
| C05F 11/08 | (2006.01) |
| C05G 3/00 | (2020.01) |
| C05G 5/12 | (2020.01) |

(52) U.S. Cl.
CPC ................ *C05B 7/00* (2013.01); *A01N 27/00* (2013.01); *A01N 31/00* (2013.01); *C05C 3/005* (2013.01); *C05C 9/005* (2013.01); *C05D 1/005* (2013.01); *C05D 1/02* (2013.01); *C05F 11/08* (2013.01); *C05G 3/00* (2013.01); *C05G 5/12* (2020.02)

(58) Field of Classification Search
CPC .... C05B 7/00; C05G 3/00; C05G 5/12; C05F 11/10; C05F 11/08; A01N 27/00; A01N 31/00; C05C 3/005; C05C 9/005; C05D 1/005; C05D 1/02
See application file for complete search history.

(56) References Cited

U.S. PATENT DOCUMENTS

2014/0121100 A1* 5/2014 Habib ...................... C05G 5/30
504/320

FOREIGN PATENT DOCUMENTS

| | | | | |
|---|---|---|---|---|
| CN | 102617197 A | | 8/2012 | |
| CN | 107188710 A | * | 9/2017 | ............ A01C 21/00 |
| CN | 110668896 A | * | 1/2020 | ............ C05D 1/00 |
| CN | 112342255 A | | 2/2021 | |
| CN | 112409076 A | * | 2/2021 | ............ C05B 7/00 |
| CN | 113880642 A | | 1/2022 | |
| CN | 113929532 A | * | 1/2022 | ............ C05B 7/00 |
| CN | 114605189 A | * | 6/2022 | ............ A01C 21/00 |
| CN | 114605192 A | * | 6/2022 | ............ C05C 11/00 |
| CN | 115612707 A | * | 1/2023 | ............ C05C 11/00 |

* cited by examiner

*Primary Examiner* — Wayne A Langel

(57) ABSTRACT

A microbial protectant in a high-nutrient and high-activity chemical fertilizer-biological compound fertilizer and a preparation method thereof are related, belonging to the technical field of biological extracts. The microbial protectant mainly includes alginate oligosaccharide and tetrahydropyrimidine, with the other ingredients further including at least one of burdock oligosaccharide, chitosan oligosaccharide, amino acid, vegetable oil, fumaric acid, and citric acid. The microbial protectant can protect microorganisms from injury and death in extreme environments, such as a high-salt environment, has broad application prospects, and may be applied to the preparation of a high-activity microbial agent and the preparation of a high-nutrient chemical fertilizer-biological compound fertilizer.

17 Claims, No Drawings

MICROBIAL PROTECTANT IN HIGH-NUTRIENT AND HIGH-ACTIVITY CHEMICAL FERTILIZER-BIOLOGICAL COMPOUND FERTILIZER AND PREPARATION METHOD THEREOF

CROSS-REFERENCE TO RELATED APPLICATIONS

The present application is a continuation application of PCT application No. PCT/CN2024/077724 filed on Feb. 20, 2024, which claims the benefit of Chinese Patent Application No. 202310138446.X filed on Feb. 20, 2023. The contents of all of the aforementioned applications are incorporated by reference herein in their entirety.

FIELD OF THE INVENTION

The present disclosure relates to a microbial protectant in a high-nutrient and high-activity chemical fertilizer-biological compound fertilizer and a preparation method thereof, belonging to the technical field of biological extracts.

BACKGROUND OF THE INVENTION

As an emerging fertilizer, the microbial fertilizer has its own development advantages. The microbial fertilizer is a bacterial agent prepared from one or several beneficial living microorganisms, which utilizes the metabolic processes or metabolites of the beneficial living microorganisms to improve plant growth conditions and promote plant growth. In the practice of long-term application of microbial fertilizer, it has been recognized that applying the microbial fertilizer alone in the field is challenging, with slow fertilizer efficiency, low farmer acceptance, and a short product shelf life.

A chemical fertilizer-biological compound fertilizer is composed of a special beneficial microbial agent and a traditional fertilizer. The organic combination of beneficial microbial agents and chemical fertilizers can not only significantly improve nutrient use efficiency, but also improve crop quality, improve soil, and enhance crop stress resistance. However, it is a worldwide problem to uniformly mix a chemical fertilizer with a high salt index and viable beneficial microorganisms to prepare a chemical fertilizer-biological compound fertilizer and maintain the high activity of beneficial microorganisms. In the existing preparation process of the chemical fertilizer-biological compound fertilizer, one way of adding microorganisms is the mixing and granulation of microorganisms with the traditional fertilizer. In the process of adding microorganisms during granulation, high temperature, high salt, drying, and other factors will cause the death of a large number of microorganisms. Therefore, in order to ensure the effect of the chemical fertilizer-biological compound fertilizer, it is necessary to solve the problem of activity of microorganisms. The patent document CN102617197A discloses a technology for the survival of an agricultural microbial agent in a high-nutrient chemical fertilizer, where 0.01‰ gibberellin crystal powder is added to an agricultural microorganism *bacillus* solution to form mature spores to enhance the reverse osmotic pressure of viable bacteria and reduce high-salt killing. In addition, 10% humic acid is added to the bacterial solution as an adsorbent, and a microporous biological niche is used to isolate the harsh environment. This patent utilizes the resistance of *Bacillus* mature spores to adverse environments for long-term survival, as well as the microporous adsorption of humic acid. The patent document CN113880642A discloses a compound microbial fertilizer, including a microbial activity protectant. The microbial activity protectant includes polyglutamic acid and trehalose. The addition of polyglutamic acid and trehalose to the compound fertilizer as the microbial activity protectant reduces the injury to phosphate-solubilizing microorganisms during the preparation and increases the effective viable number in the compound fertilizer. The protectant of this patent mainly protects the phosphate-solubilizing microorganisms in the compound microbial fertilizer from massive injury and death.

In order to improve the effective activity of functional microorganisms in the process of preparation and storage of the chemical fertilizer-biological compound fertilizer, it is very important to study the effect of different microbial protectants and different formula combinations on the viable number.

SUMMARY OF THE INVENTION

In view of the deficiencies of the related art, the present disclosure provides a microbial protectant in a high-nutrient and high-activity chemical fertilizer-biological compound fertilizer and a preparation method thereof.
Description of Terms:
The nutrient contents of nitrogen, phosphorus, and potassium refer to contents of N, $P_2O_5$, and $K_2O$.
The Technical Solutions of the Present Disclosure are as Follows:
A microbial protectant is provided, mainly including alginate oligosaccharide and tetrahydropyrimidine.
Preferably, according to the present disclosure, the microbial protectant further includes at least one of burdock oligosaccharide, chitosan oligosaccharide, amino acid, vegetable oil, fumaric acid, and citric acid.
Preferably, according to the present disclosure, components in the microbial protectant include, in parts by mass: 65-85 parts of alginate oligosaccharide, 4-6 parts of burdock oligosaccharide, 6-10 parts of chitosan oligosaccharide, 6-10 parts of amino acid, 5-10 parts of vegetable oil, 5-8 parts of tetrahydropyrimidine, 8-10 parts of fumaric acid, and 6-10 parts of citric acid.
Preferably, according to the present disclosure, alginate oligosaccharide has a molecular weight 2000 Da or less, a degree of polymerization of 2-20, and a 2-6 sugar content 70% or more.
Preferably, according to the present disclosure, burdock oligosaccharide has a degree of polymerization of 10-15.
Preferably, according to the present disclosure, amino acid includes one or more of glutamic acid, aspartic acid, and phenylalanine.
Preferably, according to the present disclosure, the vegetable oil includes soybean oil and/or castor oil.
Alginate oligosaccharide, burdock oligosaccharide, chitosan oligosaccharide, amino acid, vegetable oil, tetrahydropyrimidine, fumaric acid, and citric acid in the present disclosure may all be commercially available products.
A preparation method for the above-mentioned microbial protectant is provided, including the steps of:
quantitatively obtaining raw materials of components of the microbial protectant, and stirring and mixing uniformly to obtain the microbial protectant.
Preferably, according to the present disclosure, the raw materials of the components of the microbial protectant are added into a mixer using a quantitative feeding machine, stirred, and then mixed uniformly to obtain the microbial protectant.

Preferably, according to the present disclosure, a product after stirring uniformly is bagged through a metering and packaging machine.

Further preferably, a bagged product is stored in a dry and breathable indoor environment.

Application of the above-mentioned microbial protectant in the preparation of a microbial agent compound is provided.

The above-mentioned microbial protectant is mixed with microorganisms to prepare the microbial agent compound. The microorganisms in the microbial agent compound are effectively protected under the action of the microbial protectant to improve the survival rate in extreme environments and avoid injury and death.

Application of the above-mentioned microbial protectant in the preparation of a chemical fertilizer-biological compound fertilizer is provided.

The application of the above-mentioned microbial protectant to the chemical fertilizer-biological compound fertilizer may effectively protect the microorganisms in the chemical fertilizer-biological compound fertilizer, avoid the injury and death of the microorganisms in a high-salt environment of the fertilizer, and effectively increase the nutrient content of the inorganic chemical fertilizer in the chemical fertilizer-biological compound fertilizer.

A microbial agent compound containing the above-mentioned microbial protectant is provided.

Preferably, according to the present disclosure, a mass percentage of the microbial protectant in the microbial agent compound is more than 50%.

Further preferably, the mass percentage of the microbial protectant in the microbial agent compound is 50-90%.

A chemical fertilizer-biological compound fertilizer containing the above-mentioned microbial protectant or the above-mentioned microbial agent compound.

Preferably, according to the present disclosure, the chemical fertilizer-biological compound fertilizer has nutrient contents of nitrogen, phosphorus, and potassium of >40% and a viable number of microorganisms 200 million cfu/g or more.

Beneficial Effects of the Present Disclosure are as Follows:

1. The microbial protectant of the present disclosure includes alginate oligosaccharide, burdock oligosaccharide, chitosan oligosaccharide, amino acid, vegetable oil, tetrahydropyrimidine, fumaric acid, and citric acid, can protect the microorganisms from injury and death in extreme environments, such as a high-salt environment, has broad application prospects, and may be applied to the preparation of a high-activity microbial agent and the preparation of a high-nutrient chemical fertilizer-biological compound fertilizer.

2. After adding the above-mentioned microbial protectant to the microorganisms, the survival period of the microorganisms is extended for 6-12 months. After 12 months of storage, the viable number in the microbial agent is more than $2\times10^8$ cfu/g. After 10 days of application to the soil, the number of microorganisms is more than 550,000/g, solving the problem that the microbial fertilizer for field crops cannot be commonly used.

3. The addition of the protectant of the present disclosure produces a chemical fertilizer-biological compound fertilizer with a viable number of microorganisms of 200 million cfu/g or more, much higher than the 20 million cfu/g specified in the standard for compound microbial fertilizers "NY/T798-2015", which solves the problem of uniformly mixing a chemical fertilizer with a high salt index and viable beneficial microorganisms to produce a chemical fertilizer-biological compound fertilizer and maintaining the high activity of beneficial microorganisms.

DETAILED DESCRIPTION OF THE EMBODIMENTS

The present disclosure is further described below in conjunction with embodiments, but is not limited thereto. The amounts of the raw materials are parts by weight unless otherwise specified.

Components of the microbial protectant in the present disclosure include one or more of alginate oligosaccharide, burdock oligosaccharide, chitosan oligosaccharide, amino acid, vegetable oil, tetrahydropyrimidine, fumaric acid, and citric acid.

Alginate oligosaccharide, burdock oligosaccharide, chitosan oligosaccharide, and amino acid maintain the natural structure of biological macromolecules of microbial cells in the chemical fertilizer-biological compound fertilizer in the original hydration state through the polyhydroxyl groups contained in them, and meanwhile, they form a vitrification matrix around the cells, which is similar to a physical barrier to resist the damage of high concentrations of salt to the cells so that the cells bear less loss of activity, and thus play a protective role.

The action of vegetable oil is to increase hydrophobicity and prevent contact of microorganisms with fertilizers and moisture.

Tetrahydropyrimidine effectively protects proteins of the spore coat by forming "tetrahydropyrimidine hydrates", preventing cations from entering the spore, thereby protecting the stability and activity of the spore in a high-concentration fertilizer environment.

The action of fumaric acid and citric acid is to enhance the chemotaxis of beneficial microorganism rhizosphere and the formation of film on the root surface in the chemical fertilizer-biological compound fertilizer, improve the colonization of microorganisms in soil, and increase the colonization amount of microorganism rhizosphere by 2.0-6.0 times.

The microbial protectant in the present disclosure includes, in parts by mass, 65-85 parts of alginate oligosaccharide, 4-6 parts of burdock oligosaccharide, 6-10 parts of chitosan oligosaccharide, 6-10 parts of amino acid, 5-10 parts of vegetable oil, 5-8 parts of tetrahydropyrimidine, 8-10 parts of fumaric acid, and 6-10 parts of citric acid.

In a preferred technical solution, alginate oligosaccharide may include, in parts by mass: 65, 68, 70, 72, 75, 77, 80, 83, and 85 parts. In a preferred technical solution, burdock oligosaccharide may include, in parts by mass: 4, 5, and 6 parts. In a preferred technical solution, chitosan oligosaccharide may include, in parts by mass: 6, 7, 8, 9, and 10 parts. In a preferred technical solution, amino acid may include, in parts by mass: 6, 7, 8, 9, and 10 parts. In a preferred technical solution, the vegetable oil may include, in parts by mass: 5, 6, 7, 8, 9, and 10 parts. In a preferred technical solution, tetrahydropyrimidine may include, in parts by mass: 5, 6, 7, and 8 parts. In a preferred technical solution, fumaric acid may include, in parts by mass: 8, 9, and 10 parts. In a preferred technical solution, citric acid may include, in parts by mass: 6, 7, 8, 9, and 10 parts.

The composition and content of the microbial protectant may be adjusted according to the different species of the microorganisms to be protected. For example, a microbial protectant is provided, including, in parts by mass: 75-85 parts of alginate oligosaccharide, 5-8 parts of vegetable oil, 5-6 parts of tetrahydropyrimidine, and 8-10 parts of citric acid. This formulation is suitable for the protection of *Bacillus subtilis* (e.g., ACCC60364, ACCC19742, ACCC19743, and ACCC60383).

For example, a microbial protectant is provided, including, in parts by mass: 65-75 parts of alginate oligosaccharide, 4-6 parts of burdock oligosaccharide, 6-8 parts of vegetable oil, 5-8 parts of tetrahydropyrimidine, and 8-10 parts of fumaric acid. This formulation is suitable for the protection of *Bacillus amyloliquefaciens* (e.g., ACCC60428, ACCC10167, and ACCC60382).

For example, a microbial protectant is provided, including, in parts by mass: 75-85 parts of alginate oligosaccharide, 6-8 parts of chitosan oligosaccharide, 6-8 parts of tetrahydropyrimidine, and 6-8 parts of citric acid. This formulation is suitable for the protection of *Bacillus mucilaginosus* (e.g., CGMCC No. 17376, ACCC02983, ACCC10095, ACCC10090, and ACCC0013). The strain has the functions of degrading soil organic phosphorus, decomposing potassium, and promoting the absorption of phosphorus and potassium by plants.

For example, a microbial protectant is provided, including, in parts by mass: 80-85 parts of alginate oligosaccharide, 6-8 parts of chitosan oligosaccharide, 6-10 parts of amino acid, 6-8 parts of tetrahydropyrimidine, and 8-10 parts of fumaric acid. This formulation is suitable for the protection of *Brevibacillus laterosporu* (e.g., CGMCC No. 17377, ACCC11079).

For example, a microbial protectant is provided, including, in parts by mass: 70-80 parts of alginate oligosaccharide, 6-10 parts of chitosan oligosaccharide, 6-10 parts of vegetable oil, 6-8 parts of tetrahydropyrimidine, and 8-10 parts of fumaric acid. This formulation is suitable for the protection of mixed bacteria of *Bacillus amyloliquefaciens* (e.g., ACCC60428, ACCC10167, and ACCC60382) and *Brevibacillus laterosporu* (e.g., CGMCC No. 17377, ACCC11079).

For example, a microbial protectant is provided, including, in parts by mass: 75-85 parts of alginate oligosaccharide, 6-8 parts of chitosan oligosaccharide, 5-8 parts of vegetable oil, 5-8 parts of tetrahydropyrimidine, and 6-10 parts of citric acid. This formulation is suitable for the protection of mixed bacteria of *Bacillus subtilis* (e.g., ACCC60364, ACCC19742, ACCC19743, and ACCC60383) and *Bacillus mucilaginosus* (e.g., CGMCC No. 17376, ACCC02983, ACCC10095, ACCC10090, and ACCC0013).

The microbial protectant of the present disclosure may also protect *Bacillus megaterium* JD2023Hb and *Bacillus subtilis* KC2023Hb. In addition, when *Bacillus megaterium* JD2023Hb and *Bacillus subtilis* KC2023Hb are simultaneously present, the tolerance of other microorganisms to a high-concentration inorganic chemical fertilizer may be further improved and the protection against other microorganisms may be improved. The preservation number of *Bacillus megaterium* JD2023Hb is CGMCC NO. 29498, and the preservation number of *Bacillus subtilis* KC2023Hb is CGMCC NO. 29499.

Alginate oligosaccharide in the examples has a molecular weight 2000 Da or less, a degree of polymerization of 2-20, and a 2-6 sugar content 70% or more and is obtained by fermenting brown algae, enteromorpha, and other marine plants with a preparation method referring to patent document CN112342255A. It may also be commercially available.

Burdock oligosaccharide in the examples has a degree of polymerization of 13 and is extracted from secondary burdock roots using an enzymolysis method. Dry burdock roots are crushed and sieved through a 40-mesh sieve. Hot water extraction is carried out in a solid-solution ratio of 1:10 at 70° C. for 90 min/time, followed by suction filtration, activated carbon decolorization, concentration using a rotary evaporator, papain-seveage deproteinization, ethanol precipitation, centrifugation, multiple washing, centrifugation, and freeze-drying to obtain burdock oligosaccharide dry powder. It is also commercially available.

The vegetable oil in the examples is soybean oil.

Chitosan oligosaccharide, amino acid, vegetable oil, tetrahydropyrimidine, fumaric acid, and citric acid in the present disclosure are all commercially available products.

The strains involved in the examples, which are not specified, are strains that have been disclosed, and do not involve the preservation of microorganisms. The bacterial agents involved in the examples are processed by Shandong Lihaoyuan Bioengineering Co. Ltd.

Example 1

A microbial protectant is provided, having a mass composition of: 80 parts of alginate oligosaccharide, 6 parts of vegetable oil, 5 parts of tetrahydropyrimidine, and 9 parts of citric acid.

The above-mentioned microbial protectant is prepared as follows.

Alginate oligosaccharide, vegetable oil, tetrahydropyrimidine, and citric acid were added into a mixer using a quantitative feeding machine and stirred uniformly to obtain the microbial protectant.

The above-mentioned microbial protectant and *Bacillus subtilis* (ACCC60364) powder (200 billion cfu/g) were mixed uniformly with a mass ratio of 7.5:1 to prepare a microbial protectant-containing *Bacillus subtilis* agent. The viable number of *Bacillus subtilis* is 23.5 billion cfu/g. The above-mentioned microbial protectant-containing *Bacillus subtilis* agent was added to a nitrogen-phosphorus-potassium compound fertilizer, a mass ratio of the microbial protectant-containing *Bacillus subtilis* agent to the nitrogen-phosphorus-potassium compound fertilizer being 1:28.4, mixed uniformly, and then granulated to obtain a chemical fertilizer-biological compound fertilizer. A theoretical value of the viable number of *Bacillus subtilis* in the obtained chemical fertilizer-biological compound fertilizer was 800 million cfu/g, and the content of nitrogen, phosphorus, and potassium was 51.7%. On the first day of production, a detection value of the viable number of *Bacillus subtilis* in the chemical fertilizer-biological compound fertilizer was 730 million cfu/g. After 12 months of storage at room temperature, the viable number of *Bacillus subtilis* in the chemical fertilizer-biological compound fertilizer was 635 million cfu/g. The chemical fertilizer-biological compound fertilizer was applied to the soil with an application amount of 100 kg/667 m$^2$. After 10 days, the viable number of *Bacillus subtilis* in the soil was 602,000 cfu/g.

Example 2

A microbial protectant identical to example 1 is provided. The above-mentioned microbial protectant and *Bacillus amyloliquefaciens* (ACCC60428) powder (150 billion cfu/g) were mixed uniformly with a mass ratio of 5.56:1 to prepare a microbial protectant-containing *Bacillus amyloliquefaciens* agent. The viable number of *Bacillus amyloliquefa-*

*ciens* was 22.9 billion cfu/g. The above-mentioned microbial protectant-containing *Bacillus amyloliquefaciens* agent was added to a nitrogen-phosphorus-potassium compound fertilizer, a mass ratio of the microbial protectant-containing *Bacillus amyloliquefaciens* agent to the nitrogen-phosphorus-potassium compound fertilizer being 1:27.25, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 810 million cfu/g, and the content of nitrogen, phosphorus, and potassium was 51.6%. On the first day of production, a detection value of the viable number of *Bacillus amyloliquefaciens* in the chemical fertilizer-biological compound fertilizer was 635 million cfu/g. After 12 months of storage at room temperature, the viable number of *Bacillus amyloliquefaciens* in the chemical fertilizer-biological compound fertilizer was 580 million cfu/g. The chemical fertilizer-biological compound fertilizer was applied to the soil with an application amount of 100 kg/667 m². After 10 days, the viable number of *Bacillus amyloliquefaciens* in the soil was 585,000 cfu/g.

The above results show that although the microbial protectant shown in example 1 may also be used for the protection of *Bacillus amyloliquefaciens*, its protection is far less effective than that of *Bacillus subtilis*.

Example 3

A microbial protectant identical to example 1 is provided.

The above-mentioned microbial protectant, *Bacillus megaterium* JD2023Hb powder (100 billion cfu/g), *Bacillus subtilis* KC2023Hb powder (200 billion cfu/g), and *Bacillus amyloliquefaciens* (ACCC60428) powder (150 billion cfu/g) were mixed uniformly with a mass ratio of 3:0.1:0.1:0.54 to prepare a microbial protectant-containing mixed bacterial agent. The viable number of *Bacillus amyloliquefaciens* was 21.7 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:25.74, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 810 million cfu/g, and the content of nitrogen, phosphorus, and potassium was 51.4%. On the first day of production, a detection value of the viable number of *Bacillus amyloliquefaciens* in the chemical fertilizer-biological compound fertilizer was 726 million cfu/g. After 12 months of storage at room temperature, the viable number of *Bacillus amyloliquefaciens* in the chemical fertilizer-biological compound fertilizer was 623 million cfu/g. The chemical fertilizer-biological compound fertilizer was applied to the soil with an application amount of 100 kg/667 m². After 10 days, the viable number of *Bacillus amyloliquefaciens* in the soil was 603,000 cfu/g.

The above results show that compared with example 2, the addition of *Bacillus megaterium* JD2023Hb powder and *Bacillus subtilis* KC2023Hb powder in the microbial protectant may further improve the tolerance of *Bacillus amyloliquefaciens* to a high-concentration inorganic chemical fertilizer and enhance the biological activity of *Bacillus amyloliquefaciens*.

Comparative Example 1

A microbial protectant is provided, different from example 1, having a mass composition of: 80 parts of burdock oligosaccharide, 6 parts of vegetable oil, 5 parts of tetrahydropyrimidine, and 9 parts of citric acid.

The above-mentioned microbial protectant is prepared as follows.

Burdock oligosaccharide, vegetable oil, tetrahydropyrimidine, and citric acid were added to a mixer using a quantitative feeding machine and stirred uniformly to obtain the microbial protectant.

The above-mentioned microbial protectant and *Bacillus subtilis* (ACCC60364) powder (200 billion cfu/g) were mixed uniformly with a mass ratio of 7.5:1 to prepare a microbial protectant-containing *Bacillus subtilis* agent. The viable number of *Bacillus subtilis* is 23.5 billion cfu/g. The above-mentioned microbial protectant-containing *Bacillus subtilis* agent was added to a nitrogen-phosphorus-potassium compound fertilizer, a mass ratio of the microbial protectant-containing *Bacillus subtilis* agent to the nitrogen-phosphorus-potassium compound fertilizer being 1:28.4, mixed uniformly, and then granulated to obtain a chemical fertilizer-biological compound fertilizer. A theoretical value of the viable number of *Bacillus subtilis* in the obtained chemical fertilizer-biological compound fertilizer was 800 million cfu/g, and the content of nitrogen, phosphorus, and potassium was 51.7%. On the first day of production, a detection value of the viable number of *Bacillus subtilis* in the chemical fertilizer-biological compound fertilizer was 680 million cfu/g. After 12 months of storage at room temperature, the viable number of *Bacillus subtilis* in the chemical fertilizer-biological compound fertilizer was 603 million cfu/g. The chemical fertilizer-biological compound fertilizer was applied to the soil with an application amount of 100 kg/667 m². After 10 days, the viable number of *Bacillus subtilis* in the soil was 556,000 cfu/g.

The above results show that, after alginate oligosaccharide in the microbial protectant is replaced with burdock oligosaccharide, the protective effect is inferior to that of example 1, although the protective effect on microorganisms may be achieved to a certain extent. The microbial protectant composition of example 1 is the optimal composition for *Bacillus subtilis* protectant.

Comparative Example 2

No microbial protectant was used, and *Bacillus subtilis* (ACCC60364) powder (200 billion cfu/g) was directly added to a nitrogen-phosphorus-potassium compound fertilizer, a mass ratio of the *Bacillus subtilis* powder to the nitrogen-phosphorus-potassium compound fertilizer being 1:249, mixed uniformly, and then granulated to obtain a chemical fertilizer-biological compound fertilizer. A theoretical value of the viable number of *Bacillus subtilis* in the obtained chemical fertilizer-biological compound fertilizer was 800 million cfu/g, and the content of nitrogen, phosphorus, and potassium was 53%. On the first day of production, a detection value of the viable number of *Bacillus subtilis* in the chemical fertilizer-biological compound fertilizer was 520 million cfu/g. After 12 months of storage at room temperature, the viable number of *Bacillus subtilis* in the chemical fertilizer-biological compound fertilizer was 420 million cfu/g. The chemical fertilizer-biological compound fertilizer was applied to the soil with an application amount of 100 kg/667 m². After 10 days, the viable number of *Bacillus subtilis* in the soil was 354,000 cfu/g.

The above results show that, when the inorganic chemical fertilizer is mixed with microorganisms without the microbial protectant, a large number of microorganisms will die, and the activity of microorganisms cannot be maintained in the preservation process of the chemical fertilizer-biological compound fertilizer, leading to continuous decrease in the viable number of microorganisms.

Example 4

A microbial protectant is provided, having a mass composition of: 72 parts of alginate oligosaccharide, 6 parts of burdock oligosaccharide, 8 parts of vegetable oil, 6 parts of tetrahydropyrimidine, and 8 parts of fumaric acid.

The above-mentioned microbial protectant is prepared as follows.

Alginate oligosaccharide, burdock oligosaccharide, vegetable oil, tetrahydropyrimidine, and fumaric acid were added into a mixer using a quantitative feeding machine and stirred uniformly to obtain the microbial protectant.

The above-mentioned microbial protectant and *Bacillus amyloliquefaciens* (ACCC60428) powder (150 billion cfu/g) were mixed uniformly with a mass ratio of 5.56:1 to prepare a microbial protectant-containing *Bacillus amyloliquefaciens* agent. The viable number of *Bacillus amyloliquefaciens* was 22.9 billion cfu/g. The above-mentioned microbial protectant-containing *Bacillus amyloliquefaciens* agent was added to a nitrogen-phosphorus-potassium compound fertilizer, a mass ratio of the microbial protectant-containing *Bacillus amyloliquefaciens* agent to the nitrogen-phosphorus-potassium compound fertilizer being 1:27.25, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 810 million cfu/g, and the content of nitrogen, phosphorus, and potassium was 51.6%. On the first day of production, a detection value of the viable number of *Bacillus amyloliquefaciens* in the chemical fertilizer-biological compound fertilizer was 750 million cfu/g. After 12 months of storage at room temperature, the viable number of *Bacillus amyloliquefaciens* in the chemical fertilizer-biological compound fertilizer was 689 million cfu/g. The chemical fertilizer-biological compound fertilizer was applied to the soil with an application amount of 100 kg/667 m². After 10 days, the viable number of *Bacillus amyloliquefaciens* in the soil was 623,000 cfu/g.

Example 5

A microbial protectant identical to example 4 is provided.

The above-mentioned microbial protectant and *Bacillus subtilis* (ACCC60364) powder (200 billion cfu/g) were mixed uniformly with a mass ratio of 7.5:1 to prepare a microbial protectant-containing *Bacillus subtilis* agent. The viable number of *Bacillus subtilis* is 23.5 billion cfu/g. The above-mentioned microbial protectant-containing *Bacillus subtilis* agent was added to a nitrogen-phosphorus-potassium compound fertilizer, a mass ratio of the microbial protectant-containing *Bacillus subtilis* agent to the nitrogen-phosphorus-potassium compound fertilizer being 1:28.41, mixed uniformly, and then granulated to obtain a chemical fertilizer-biological compound fertilizer. A theoretical value of the viable number of *Bacillus subtilis* in the obtained chemical fertilizer-biological compound fertilizer was 800 million cfu/g, and the content of nitrogen, phosphorus, and potassium was 51.7%. On the first day of production, the viable number of *Bacillus subtilis* in the chemical fertilizer-biological compound fertilizer was detected to be 626 million cfu/g. After 12 months of storage at room temperature, the viable number of *Bacillus subtilis* in the chemical fertilizer-biological compound fertilizer was 573 million cfu/g. The chemical fertilizer-biological compound fertilizer was applied to the soil with an application amount of 100 kg/667 m². After 10 days, the viable number of *Bacillus subtilis* in the soil was 586,000 cfu/g.

The above results show that although the microbial protectant shown in example 4 may also be used for the protection of *Bacillus subtilis*, its protection is far less effective than that of *Bacillus amyloliquefaciens*.

Example 6

A microbial protectant identical to example 4 is provided.

The above-mentioned microbial protectant, *Bacillus megaterium* JD2023Hb powder (100 billion cfu/g), *Bacillus subtilis* KC2023Hb powder (200 billion cfu/g), and *Bacillus subtilis* (ACCC60364) powder (200 billion cfu/g) were mixed uniformly with a mass ratio of 3:0.1:0.1:0.4 to prepare a microbial protectant-containing mixed bacterial agent. The viable number of *Bacillus subtilis* ACCC60364 was 22.2 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:26.78, mixed uniformly, and then granulated to obtain a chemical fertilizer-biological compound fertilizer. A theoretical value of the viable number of *Bacillus subtilis* ACCC60364 in the obtained chemical fertilizer-biological compound fertilizer was 800 million cfu/g, and the content of nitrogen, phosphorus, and potassium was 51.5%. On the first day of production, the viable number of *Bacillus subtilis* ACCC60364 in the chemical fertilizer-biological compound fertilizer was detected to be 724 million cfu/g. After 12 months of storage at room temperature, the viable number of *Bacillus subtilis* ACCC60364 in the chemical fertilizer-biological compound fertilizer was 682 million cfu/g. The chemical fertilizer-biological compound fertilizer was applied to the soil with an application amount of 100 kg/667 m². After 10 days, the viable number of *Bacillus subtilis* ACCC60364 in the soil was 618,000 cfu/g.

The above results show that compared with example 5, the addition of *Bacillus megaterium* JD2023Hb powder and *Bacillus subtilis* KC2023Hb powder in the microbial protectant may further improve the tolerance of *Bacillus subtilis* ACCC60364 to a high-concentration inorganic chemical fertilizer and enhance the biological activity of *Bacillus subtilis* ACCC60364.

Comparative Example 3

A microbial protectant is provided, different from example 4, having a mass composition of: 72 parts of alginate oligosaccharide, 6 parts of burdock oligosaccharide, 8 parts of vegetable oil, 6 parts of trehalose, and 8 parts of fumaric acid.

The above-mentioned microbial protectant is prepared as follows.

Alginate oligosaccharide, burdock oligosaccharide, vegetable oil, trehalose, and fumaric acid were added into a mixer using a quantitative feeding machine and stirred uniformly to obtain the microbial protectant.

The above-mentioned microbial protectant and *Bacillus amyloliquefaciens* (ACCC60428) powder (150 billion cfu/g) were mixed uniformly with a mass ratio of 5.56:1 to prepare a microbial protectant-containing *Bacillus amyloliquefaciens* agent. The viable number of *Bacillus amyloliquefa-*

*ciens* was 22.9 billion cfu/g. The above-mentioned microbial protectant-containing *Bacillus amyloliquefaciens* agent was added to a nitrogen-phosphorus-potassium compound fertilizer, a mass ratio of the microbial protectant-containing *Bacillus amyloliquefaciens* agent to the nitrogen-phosphorus-potassium compound fertilizer being 1:27.25, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 810 million cfu/g, and the content of nitrogen, phosphorus, and potassium was 51.6%. On the first day of production, a detection value of the viable number of *Bacillus amyloliquefaciens* in the chemical fertilizer-biological compound fertilizer was 720 million cfu/g. After 12 months of storage at room temperature, the viable number of *Bacillus amyloliquefaciens* in the chemical fertilizer-biological compound fertilizer was 635 million cfu/g. The chemical fertilizer-biological compound fertilizer was applied to the soil with an application amount of 100 kg/667 $m^2$. After 10 days, the viable number of *Bacillus amyloliquefaciens* in the soil was 563,000 cfu/g.

The above results show that compared with example 4, tetrahydropyrimidine in the microbial protectant is replaced with trehalose, although both can stabilize the protein structure of the strain, the protective effect of the microbial protectant of example 3 to *Bacillus amyloliquefaciens* is inferior to that of example 4. The microbial protectant composition of example 4 is the optimal composition for *Bacillus amyloliquefaciens* protectant.

Comparative Example 4

No microbial protectant was used, and *Bacillus amyloliquefaciens* (ACCC60428) powder (150 billion cfu/g) was directly added to a nitrogen-phosphorus-potassium compound fertilizer, a mass ratio of the *Bacillus amyloliquefaciens* powder to the nitrogen-phosphorus-potassium compound fertilizer being 1:184.9, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 810 million cfu/g, and the content of nitrogen, phosphorus, and potassium was 52.9%. On the first day of production, a detection value of the viable number of *Bacillus amyloliquefaciens* in the chemical fertilizer-biological compound fertilizer was 590 million cfu/g. After 12 months of storage at room temperature, the viable number of *Bacillus amyloliquefaciens* in the chemical fertilizer-biological compound fertilizer was 460 million cfu/g. The chemical fertilizer-biological compound fertilizer was applied to the soil with an application amount of 100 kg/667 $m^2$. After 10 days, the viable number of *Bacillus amyloliquefaciens* in the soil was 364,000 cfu/g.

The above results show that, when the inorganic chemical fertilizer is mixed with microorganisms without the microbial protectant, a large number of microorganisms will die, and the activity of microorganisms cannot be maintained in the preservation process of the chemical fertilizer-biological compound fertilizer, leading to continuous decrease in the viable number of microorganisms.

Example 7

A microbial protectant is provided, having a mass composition of: 74 parts of alginate oligosaccharide, 6 parts of chitosan oligosaccharide, 6 parts of vegetable oil, 6 parts of tetrahydropyrimidine, and 8 parts of fumaric acid.

The above-mentioned microbial protectant is prepared as follows.

Alginate oligosaccharide, chitosan oligosaccharide, vegetable oil, tetrahydropyrimidine, and fumaric acid were added into a mixer using a quantitative feeding machine and stirred uniformly to obtain the microbial protectant.

The above-mentioned microbial protectant, *Bacillus amyloliquefaciens* (ACCC10167) powder (150 billion cfu/g), and *Brevibacillus laterosporu* (CGMCC No. 17377) powder (10 billion cfu/g) were mixed uniformly with a mass ratio of 3:0.4:2 to prepare a microbial protectant-containing mixed bacterial agent. The total viable number of the mixed bacteria was 14.8 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:17.52, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 600 million cfu/g, a theoretical value of the viable number of *Brevibacillus laterosporu* was 200 million cfu/g, and the content of nitrogen, phosphorus, and potassium was 50.6%. On the first day of production, the viable number of *Bacillus amyloliquefaciens* was detected to be 550 million cfu/g, and the viable number of *Brevibacillus laterosporu* was detected to be 118 million cfu/g. After 12 months of storage at room temperature, the viable number of *Bacillus amyloliquefaciens* in the chemical fertilizer-biological compound fertilizer was 498 million cfu/g, and the viable number of *Brevibacillus laterosporu* was 155 million cfu/g. The chemical fertilizer-biological compound fertilizer was applied to the soil with an application amount of 100 kg/667 $m^2$. After 10 days, the viable number of *Bacillus amyloliquefaciens* in the soil was 409,000 cfu/g, and the viable number of *Brevibacillus laterosporu* was 168,500 cfu/g.

Comparative Example 5

A microbial protectant is provided, different from example 7, having a mass composition of: 74 parts of burdock oligosaccharide, 6 parts of chitosan oligosaccharide, 6 parts of vegetable oil, 6 parts of tetrahydropyrimidine, and 8 parts of fumaric acid.

The above-mentioned microbial protectant is prepared as follows.

Burdock oligosaccharide, chitosan oligosaccharide, vegetable oil, tetrahydropyrimidine, and fumaric acid were added into a mixer using a quantitative feeding machine and stirred uniformly to obtain the microbial protectant.

The above-mentioned microbial protectant, *Bacillus amyloliquefaciens* (ACCC10167) powder (150 billion cfu/g), and *Brevibacillus laterosporu* (CGMCC No. 17377) powder (10 billion cfu/g) were mixed uniformly with a mass ratio of 3:0.4:2 to prepare a microbial protectant-containing mixed bacterial agent. The total viable number of the mixed bacteria was 14.8 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:17.52, mixed uniformly, and then granulated to obtain a chemical fertilizer-biological compound fertilizer. A theoretical value of the viable number of *Bacillus amyloliquefaciens* in the obtained chemical fertilizer-biological compound fertilizer was 600 million cfu/g, a theoretical value of the viable number of *Brevibacillus laterosporu* was 200 million cfu/g, and the content of nitrogen, phosphorus, and potassium was 50.6%. On the first day of production, the viable number of *Bacillus amyloliquefaciens* in the chemical fertilizer-biological compound fertilizer was detected to be 510 million cfu/g, and the viable number of *Brevibacillus laterosporu* was detected to be 167 million cfu/g. After 12 months of storage at room temperature, the viable number of *Bacillus amyloliquefaciens* in the chemical fertilizer-biological compound fertilizer was 463 million cfu/g, and the viable number of *Brevibacillus laterosporu* was 149 million cfu/g. The chemical fertilizer-biological compound fertilizer was applied to the soil with an application amount of 100 kg/667 m$^2$. After 10 days, the viable number of *Bacillus amyloliquefaciens* in the soil was 392,000 cfu/g, and the viable number of *Brevibacillus laterosporu* was 163,500 cfu/g.

Comparative Example 6

No microbial protectant was used, and *Bacillus amyloliquefaciens* (ACCC10167) powder (150 billion cfu/g) and *Brevibacillus laterosporu* (CGMCC No. 17377) powder (10 billion cfu/g) were directly added to a nitrogen-phosphorus-potassium compound fertilizer, a mass ratio of the nitrogen-phosphorus-potassium compound fertilizer, *Bacillus amyloliquefaciens* powder, and *Brevibacillus laterosporu* powder being 97.6:0.4:2, mixed uniformly, and then granulated to obtain a chemical fertilizer-biological compound fertilizer. A theoretical number of the viable number of *Bacillus amyloliquefaciens* in the obtained chemical fertilizer-biological compound fertilizer was 600 million cfu/g, a theoretical number of the viable number of *Brevibacillus laterosporu* was 200 million cfu/g, and the content of nitrogen, phosphorus, and potassium was 52.3%. On the first day of production, the viable number of *Bacillus amyloliquefaciens* in the chemical fertilizer-biological compound fertilizer was detected to be 360 million cfu/g, and the viable number of *Brevibacillus laterosporu* was detected to be 120 million cfu/g. After 12 months of storage at room temperature, the viable number of *Bacillus amyloliquefaciens* in the chemical fertilizer-biological compound fertilizer was 268 million cfu/g, and the viable number of *Brevibacillus laterosporu* was 55 million cfu/g. The chemical fertilizer-biological compound fertilizer was applied to the soil with an application amount of 100 kg/667 m$^2$. After 10 days, the viable number of *Bacillus amyloliquefaciens* in the soil was 206,000 cfu/g, and the viable number of *Brevibacillus laterosporu* was 53,500 cfu/g.

Example 8

A microbial protectant is provided, having a mass composition of: 75 parts of alginate oligosaccharide, 7 parts of chitosan oligosaccharide, 6 parts of vegetable oil, 5 parts of tetrahydropyrimidine, and 7 parts of citric acid.

The above-mentioned microbial protectant is prepared as follows.

Alginate oligosaccharide, chitosan oligosaccharide, vegetable oil, tetrahydropyrimidine, and citric acid were added into a mixer using a quantitative feeding machine and stirred uniformly to obtain the microbial protectant.

The above-mentioned microbial protectant, *Bacillus subtilis* (ACCC19742) powder (200 billion cfu/g), and *Bacillus mucilaginosus* (CGMCC No. 17376) powder (20 billion cfu/g) were mixed uniformly with a mass ratio of 3:0.3:1 to prepare a microbial protectant-containing mixed bacterial agent. The total viable number of the mixed bacteria was 18.6 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:22.26, mixed uniformly, and then granulated to obtain a chemical fertilizer-biological compound fertilizer. A theoretical value of the viable number of *Bacillus subtilis* in the obtained chemical fertilizer-biological compound fertilizer was 600 million cfu/g, a theoretical value of the viable number of *Bacillus mucilaginosus* was 200 million cfu/g, and the content of nitrogen, phosphorus, and potassium was 51.1%. On the first day of production, the viable number of *Bacillus subtilis* in the chemical fertilizer-biological compound fertilizer was detected to be 560 million cfu/g, and the viable number of *Bacillus mucilaginosus* was detected to be 176 million cfu/g. After 12 months of storage at room temperature, the viable number of *Bacillus subtilis* in the chemical fertilizer-biological compound fertilizer was 487 million cfu/g, and the viable number of *Bacillus mucilaginosus* was 150 million cfu/g. The chemical fertilizer-biological compound fertilizer was applied to the soil with an application amount of 100 kg/667 m$^2$. After 10 days, the viable number of *Bacillus subtilis* in the soil was 413,000 cfu/g, and the viable number of *Bacillus mucilaginosus* was 160,200 cfu/g.

Comparative Example 7

A microbial protectant is provided, different from example 8, having a mass composition of: 75 parts of alginate oligosaccharide, 7 parts of chitosan oligosaccharide, 6 parts of vegetable oil, 5 parts of trehalose, and 7 parts of citric acid.

The above-mentioned microbial protectant is prepared as follows.

Alginate oligosaccharide, chitosan oligosaccharide, vegetable oil, trehalose, and citric acid were added into a mixer using a quantitative feeding machine and stirred uniformly to obtain the microbial protectant.

The above-mentioned microbial protectant, *Bacillus subtilis* (ACCC19742) powder (200 billion cfu/g), and *Bacillus mucilaginosus* (CGMCC No. 17376) powder (20 billion cfu/g) were mixed uniformly with a mass ratio of 3:0.3:1 to prepare a microbial protectant-containing mixed bacterial agent. The total viable number of the mixed bacteria was 18.6 billion cfu/g. The above-mentioned microbial protectant-containing mixed bacterial agent was added to a nitrogen-phosphorus-potassium compound fertilizer, a mass ratio of the microbial protectant-containing mixed bacterial agent to the nitrogen-phosphorus-potassium compound fertilizer being 1:22.26, mixed uniformly, and then granulated to obtain a chemical fertilizer-biological compound fertilizer. A theoretical value of the viable number of *Bacillus subtilis* in the obtained chemical fertilizer-biological compound fertilizer was 600 million cfu/g, a theoretical value of the viable number of *Bacillus mucilaginosus* was 200 million cfu/g, and the content of nitrogen, phosphorus, and potassium was 51.1%. On the first day of production, the viable number of *Bacillus subtilis* in the chemical fertilizer-biological compound fertilizer was detected to be 530 million cfu/g, and the viable number of *Bacillus mucilaginosus* was detected to be 165 million cfu/g. After 12 months of storage at room temperature, the viable number of *Bacillus subtilis* in the chemical fertilizer-biological compound fertilizer was 465 million cfu/g, and the viable number of *Bacillus mucilaginosus* was 132 million cfu/g. The chemical fertilizer-biological compound fertilizer was applied to the soil with an application amount of 100 kg/667 m². After 10 days, the viable number of *Bacillus subtilis* in the soil was 398,000 cfu/g, and the viable number of *Bacillus mucilaginosus* was 153,000 cfu/g.

Comparative Example 8

No microbial protectant was used, and *Bacillus subtilis* (ACCC19742) powder (200 billion cfu/g) and *Bacillus mucilaginosus* (CGMCC No. 17376) powder (20 billion cfu/g) were directly added to a nitrogen-phosphorus-potassium compound fertilizer, a mass ratio of the nitrogen-phosphorus-potassium compound fertilizer, *Bacillus subtilis* powder, and *Bacillus mucilaginosus* powder being 98.7:0.3:1, mixed uniformly, and then granulated to obtain a chemical fertilizer-biological compound fertilizer. A theoretical number of the viable number of *Bacillus subtilis* in the obtained chemical fertilizer-biological compound fertilizer was 600 million cfu/g, a theoretical number of the viable number of *Bacillus mucilaginosus* was 200 million cfu/g, and the content of nitrogen, phosphorus, and potassium was 52.8%. On the first day of production, the viable number of *Bacillus subtilis* in the chemical fertilizer-biological compound fertilizer was detected to be 420 million cfu/g, and the viable number of *Bacillus mucilaginosus* was detected to be 102 million cfu/g. After 12 months of storage at room temperature, the viable number of *Bacillus subtilis* in the chemical fertilizer-biological compound fertilizer was 289 million cfu/g, and the viable number of *Bacillus mucilaginosus* was 60 million cfu/g. The chemical fertilizer-biological compound fertilizer was applied to the soil with an application amount of 100 kg/667 m². After 10 days, the viable number of *Bacillus subtilis* in the soil was 210,500 cfu/g, and the viable number of *Bacillus mucilaginosus* was 68,000 cfu/g.

The invention claimed is:

1. A microbial protectant, mainly comprising 65-85 parts of alginate oligosaccharide and 5-8 parts of tetrahydropyrimidine.

2. The microbial protectant according to claim 1, further comprising at least one of burdock oligosaccharide, chitosan oligosaccharide, amino acid, vegetable oil, fumaric acid, and citric acid.

3. The microbial protectant according to claim 2, wherein components in the microbial protectant comprise, in parts by mass: 4-6 parts of burdock oligosaccharide, 6-10 parts of chitosan oligosaccharide, 6-10 parts of amino acid, 5-10 parts of vegetable oil, 8-10 parts of fumaric acid, and 6-10 parts of citric acid.

4. The microbial protectant according to claim 3, wherein the burdock oligosaccharide has a degree of polymerization of 10-15.

5. The microbial protectant according to claim 3, wherein the amino acid comprises one or more of glutamic acid, aspartic acid, and phenylalanine.

6. The microbial protectant according to claim 3, wherein the vegetable oil comprises soybean oil and/or castor oil.

7. A microbial agent compound containing the microbial protectant according to claim 2.

8. A chemical fertilizer-biological compound fertilizer containing the microbial protectant according to claim 2.

9. A microbial agent compound containing the microbial protectant according to claim 1.

10. A chemical fertilizer-biological compound fertilizer containing the microbial agent compound according to claim 9.

11. The chemical fertilizer-biological compound fertilizer according to claim 10, wherein the chemical fertilizer-biological compound fertilizer has nutrient contents of nitrogen, phosphorus, and potassium of >40% and a viable number of microorganisms 200 million cfu/g or more.

12. The microbial agent compound according to claim 9, wherein a mass percentage of the microbial protectant in the microbial agent compound is more than 50%.

13. A chemical fertilizer-biological compound fertilizer containing the microbial protectant according to claim 1.

14. The chemical fertilizer-biological compound fertilizer according to claim 13, wherein the chemical fertilizer-biological compound fertilizer has nutrient contents of nitrogen, phosphorus, and potassium of >40% and a viable number of microorganisms 200 million cfu/g or more.

15. The microbial protectant according to claim 1, wherein the alginate oligosaccharide has a molecular weight of 2000 Da or less, a degree of polymerization of 2-20, and a 2-6 sugar content of 70% or more.

16. A method for preparing a microbial protectant, comprising the steps of:
quantitatively obtaining raw materials of components of the microbial protectant, and stirring and mixing uniformly to obtain the microbial protectant, wherein the raw materials of components of the microbial protectant include of alginate oligosaccharide, tetrahydropyrimidine and one or more of burdock oligosaccharide, chitosan oligosaccharide, amino acid, vegetable oil, tetrahydropyrimidine, fumaric acid, and citric acid, wherein the microbial protectant comprises 65-85 parts of alginate oligosaccharide and 5-8 parts of tetrahydropyrimidine.

17. The method according to claim 16, wherein the raw materials of the components of the microbial protectant are added into a mixer using a quantitative feeding machine, stirred, and then mixed uniformly to obtain the microbial protectant.

\* \* \* \* \*